United States Patent
Gough

(10) Patent No.: US 6,901,455 B2
(45) Date of Patent: May 31, 2005

(54) PERIPHERAL SHARING DEVICE WITH UNIFIED CLIPBOARD MEMORY

(75) Inventor: Corey D. Gough, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 09/895,677

(22) Filed: Jun. 29, 2001

(65) Prior Publication Data

US 2003/0005186 A1 Jan. 2, 2003

(51) Int. Cl.[7] .................................................. G06F 3/00
(52) U.S. Cl. .............................. 710/8; 710/15; 710/22; 710/38; 370/392; 370/395
(58) Field of Search .............................. 710/8, 22, 38, 710/15; 370/392, 395

(56) References Cited

U.S. PATENT DOCUMENTS

| | | | | |
|---|---|---|---|---|
| 5,499,377 A | * | 3/1996 | Lee | 709/244 |
| 5,583,861 A | * | 12/1996 | Holden | 370/395.42 |
| 5,721,842 A | * | 2/1998 | Beasley et al. | 709/204 |
| 5,884,096 A | * | 3/1999 | Beasley et al. | 710/38 |
| 5,964,834 A | * | 10/1999 | Crutcher | 709/213 |
| 6,209,021 B1 | * | 3/2001 | Ahimovic et al. | 709/204 |
| 6,347,087 B1 | * | 2/2002 | Ganesh et al. | 370/392 |
| 6,388,658 B1 | * | 5/2002 | Ahern et al. | 345/168 |
| 6,393,419 B1 | * | 5/2002 | Novak et al. | 707/8 |
| 6,496,838 B1 | * | 12/2002 | Zamora-McKelvy et al. | 707/201 |
| 6,647,432 B1 | * | 11/2003 | Ahmed et al. | 719/318 |

FOREIGN PATENT DOCUMENTS

JP   2004234230 A   *   8/2004   ............. G06F/3/00

* cited by examiner

Primary Examiner—Jeffrey Gaffin
Assistant Examiner—Niketa Patel
(74) Attorney, Agent, or Firm—Sharmini N. Green

(57) ABSTRACT

A method and apparatus for implementing unified clipboard memory within a keyboard, video and mouse (KVM) switch device is described. The device enables a selected one of several associated computers to read and write from the unified memory inside a KVM switch. A user can share and transfer data quickly between computers even without a network connection or direct connection between the computers.

17 Claims, 3 Drawing Sheets

PERIPHERAL SHARING DEVICE WITH UNIFIED CLIPBOARD MEMORY

BACKGROUND OF THE INVENTION

The present invention pertains to a method and apparatus for implementing unified clipboard memory for use in a keyboard, video and mouse (KVM) switch device. More specifically, the present invention pertains to enabling a selected one of several computers to write to and read from unified memory inside a KVM switch.

The clipboard is typically defined as an area in the computer's memory that functions as a holding place for data that was last cut or copied from a document or file. The data stored on the clipboard can then be inserted (pasted) into other documents and other applications. When data is cut or copied, it is temporarily saved in a portion of system memory commonly referred to as clipboard memory. Subsequently, when the paste command is used, the clipboard memory is accessed to retrieve the data that was last saved on the clipboard and displayed.

Keyboard, video and mouse (KVM) switches are well-known devices that allow multiple computers to share the same keyboard, mouse, and video monitor (commonly known as computer peripherals). KVM switch boxes enable a user to switch access between one of a number of associated computers connected to the box. Typically, each computer is connected to the switch box using standard PS/2 (Personal System 2, IBM technical reference), USB (Universal Serial Bus specification Version 1.0, Jan. 19, 1996) and VGA (Video Graphics Array standard, IBM, 1987) cabling. The keyboard, video and mouse are also attached to connections on the switch box. This allows the peripherals to communicate with any one of the connected computers currently selected regardless of the data protocol used by any of the components connected to the KVM switch box.

A KVM switch box will typically have at least one set of ports for the peripherals to transmit to and receive signals from the switch box. Several sets of computer ports (i.e. interface connections for keyboard, video and mouse) are also made available to connect each of the associated computers to the switch box. A button or knob is placed on the switch box to select which one of the associated computers is currently communicating with the peripherals. Other known embodiments of KVM switches include several sets of ports for additional peripherals or employment of a different switching mechanism and architecture (e.g. allowing for remote switching via keyboard or mouse commands).

KVM switch boxes are used in environments where users need access to multiple computers at the same physical location, allowing users to quickly alternate usage between one of several associated computers while using the same set of peripherals. However, the switch boxes lack the ability to enable the associated computers to directly transfer data to one another.

One solution to transfer clipboard data across two computers has been to cut or copy the content from one document, paste the content into a new document, and transfer the new document to the target computer using removable storage media or over a network. After the file is transferred, the document must be opened, and the user must perform another cut and paste operation in order to get the content to the target document.

In view of the above, there is a need for a method and apparatus for implementing unified clipboard memory over multiple computers.

DETAILED DESCRIPTION OF THE DRAWINGS

Figure 1:
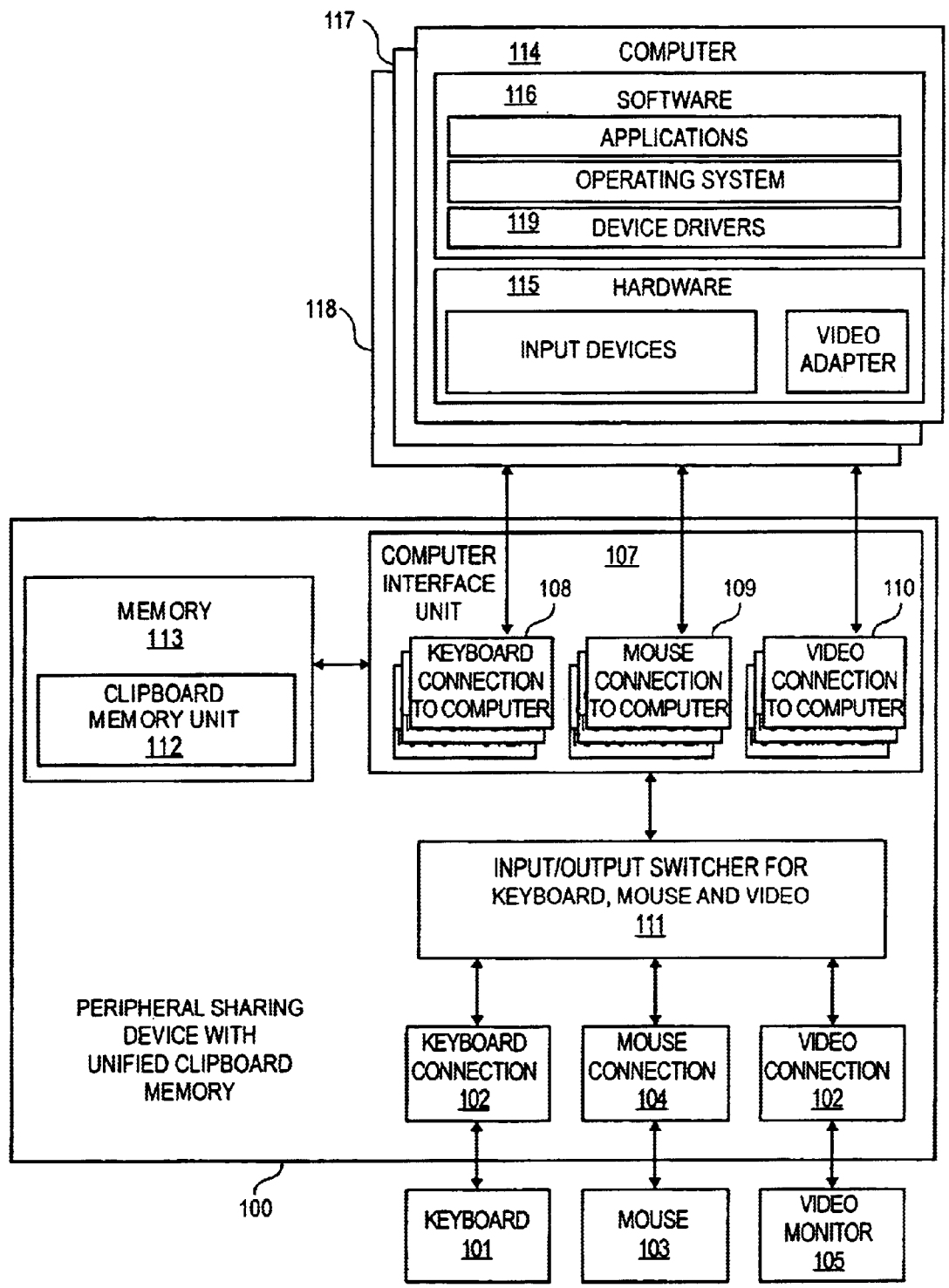
FIG. 1 is a block diagram of a portion of the system of components employing an embodiment of the present invention.

Referring to FIG. 1, a block diagram of a portion of the system of components employing an embodiment of the present invention is shown. In this embodiment, a peripheral sharing device with unified clipboard memory 100 is connected to one set of peripherals to communicate with and access associated computers 114, 117, and 118. Keyboard 101 is connected to device 100 via keyboard connection 102. Likewise, mouse 103 is connected to device 100 via mouse connection 104 and video monitor 105 to device 100 via video connection 106. Keyboard and mouse connection interfaces include, but are not limited to, Serial (Recommended Standard-232, Electronics Industries Association), PS/2 and USB standards. Video monitor connection interfaces include, but are not limited to, VGA, DVI (Digital Visual Interface specification, Digital Display Working Group, September 1998), Composite Video, S-Video, and Component Video. Computer interface unit 107 utilizes the same cabling interfaces as mentioned above and provides sets of ports to connect associated computers 114, 117, and 118 to device 100. Each set of ports will provide a keyboard connection, mouse connection and video connection for an associated computer with corresponding interface connections. Here, associated computer 114 contains physical hardware 115 with interface connections for input devices and a video adapter that allows device 100 to physically connect computer 114 to keyboard connection 108, mouse connection 109 and video connection 110. Input/output switcher 111 handles inputs and outputs from computer interface unit 107 and peripheral connections 102, 104 and 106. Switcher 111 controls the proper transfer of inputs and outputs between peripherals, the currently selected computer and clipboard memory unit 112.

In this embodiment of the device 100, data is retrieved by clipboard memory unit 112 from computer 114 (i.e., from data within software components 116) via keyboard and mouse cabling between computer 114 and computer interface unit 107. Data (i.e., data in any format, including but not limited to, selected text, images, and documents) is written to and read from the random access memory 113. Memory 113 can be any type of fast magnetic data storage modules, which includes but is not limited to, Synchronous Dynamic Random Access Memory in Dual In-Line Memory Modules (SDRAM DIMMs), RAMBUS In-Line Memory Modules (RIMMs), and removable or fixed Flash Memory cards.

Software components 116 are installed on each of the associated computers 114, 117 and 118. As is known in the art, software device drivers create an abstract layer between the operating system and hardware, providing for a software interface to the physical hardware. Device drivers 119 allow other software components on a selected computer to communicate with device 100, utilizing the read/write capability of clipboard memory unit 112. Device drivers 119 also enable the transfer of data between the selected computer and device 100 through the input device cabling (i.e. the device driver will be written to transfer data over the specific type of peripheral bus, including but not limited to Serial, PS/2 and USB standards). Additional software components include a software service that handles the cut-and-paste operations integrated within a targeted operating system or application. The software service will interpret the cut-and-paste commands to transfer data between memory in device 100 and the selected computer. The software service may also be implemented as a stand-alone service, as an enhancement to the operating system, to enable additional features, including but not limited to user-selected keystrokes to perform the cut-and-paste operations and enabling whether cut-and-paste commands are exclusive to the system or the device.

Figure 2:
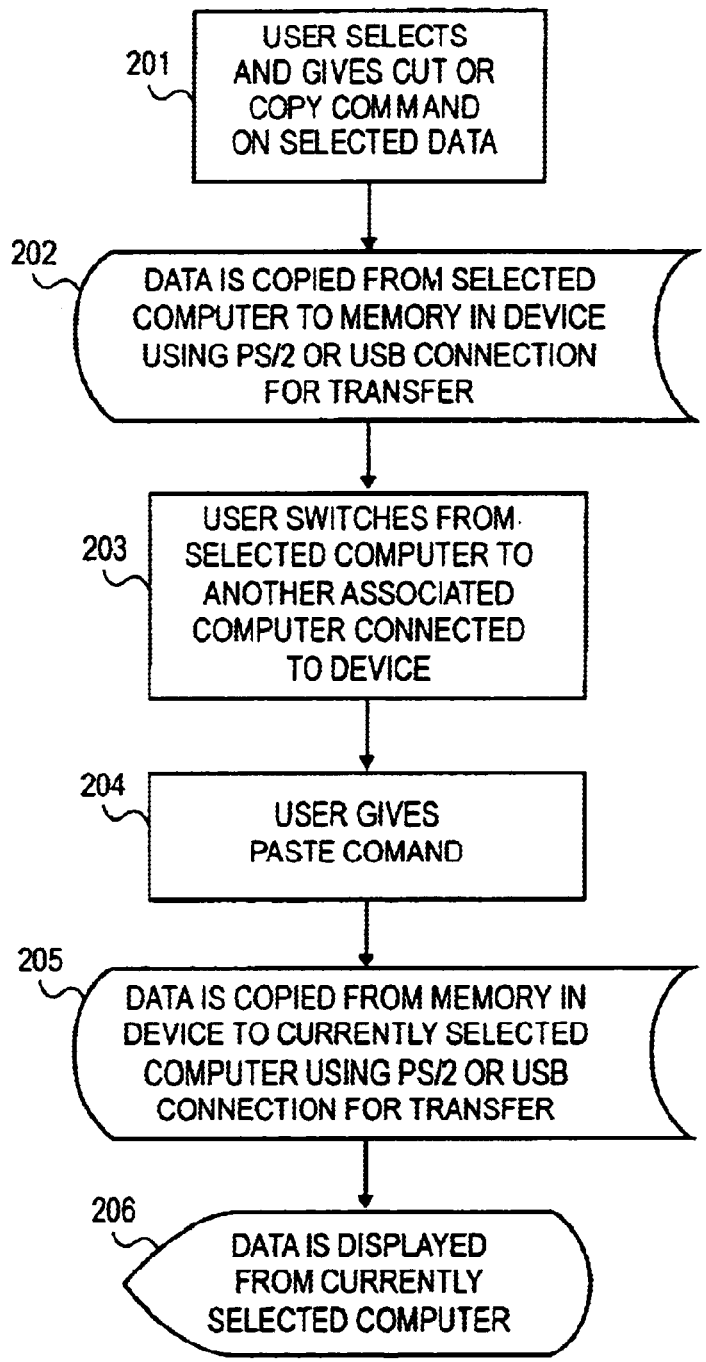
FIG. 2 is a flow diagram showing an embodiment of a method according to an embodiment of the present invention.

An example of the operation of the peripheral sharing device with unified clipboard memory 100 is shown in FIG. 2. In block 201, the user selects data (e.g. highlights text in a document) and gives a cut or copy command. At the application level, this command initiates a system function call to copy the data to the system clipboard memory. At the operating system level, this command indicates that the clipboard data should also be sent to device 100. Control is then passed to block 202 at the device driver level, where a device driver function call is made to send the data to device 100 and clipboard memory unit 112. At the device level, the data is stored in memory modules 113. In block 203, the user switches from the currently selected computer to another associated computer connected to device 100. At the device level, input/output switcher 111 enables the keyboard, mouse and video to communicate and access the newly selected computer. In block 204, the user selects a position where the data is to be placed and gives a paste command. At the application level, this command initiates a system function call to retrieve data from system clipboard memory. At the operating system level, this command indicates that the clipboard data should come from device 100. Control is then passed to block 205 at the device driver level, where a device driver function call is made to read from device 100 and clipboard memory unit 112. At the device level, the data is retrieved from memory modules 113. In block 206, the data is inserted at the selected position and displayed from the currently selected computer.

Figure 3:
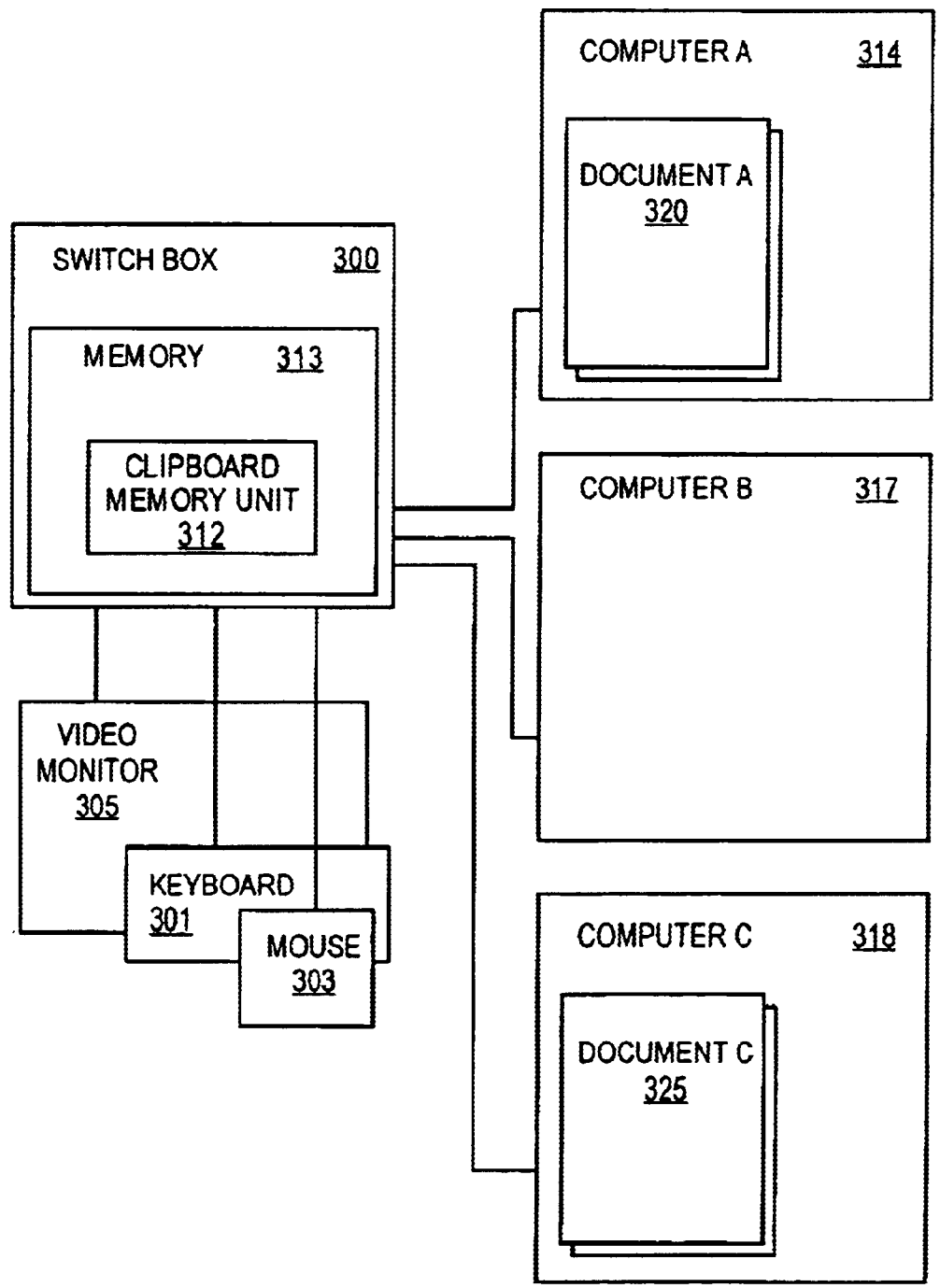
FIG. 3 is a block diagram showing a portion of the system of components employing a method according to an embodiment of the present invention.

Referring to FIG. 3, a block diagram of a number of associated computers and the peripheral sharing device with unified clipboard memory, with a portion of its components, operated according to an embodiment of the present invention is shown. In this embodiment, peripheral sharing device with unified clipboard memory 300 utilizes various components including clipboard memory unit 312 and memory 313. Device 300 is connected to keyboard 301, mouse 303 and video monitor 305 via peripheral sharing connections as described above. In this embodiment, three computers, computer A 314, computer B 317 and computer C 318 are connected to device 100 using standard PS/2 or USB cable connections as described above.

In the operation of the invention according to this embodiment, a user selects data (e.g. a selection of text or image) from document A 320 accessed from computer A 314. The user gives the operating system command to copy or cut the selected data from computer A 320. The data is transferred and copied to clipboard memory unit 312 using the PS/2 or USB connections for transfer. The data is stored in memory module 313. The user switches access from computer A 314 to computer C 318, such that computer C 318 controls peripherals keyboard 301, mouse 303 and video monitor 305. As such, the user has the ability to access document C 325 on computer C 318 and gives the operating system command to paste the selected data to document C 325. The data is then retrieved from memory module 313. The data is transferred and copied from clipboard memory unit 312 to computer C 318 again using the PS/2 or USB connections for transfer. The data selected from document A 320 is pasted into document C 325, and henceforth, accessible on computer C 318. The data in clipboard memory unit 312 is also accessible by the other associated computers, including computer B 317.

The peripheral sharing device with unified clipboard memory may also be used to copy larger amounts of data (including files, folders and applications) across associated machines. For example, a user could copy a number of directories (and files specified within them) from one computer which would create a moniker (an item identifying paths and files on a system) in the unified clipboard. After switching to another associated computer, when the user performs a paste operation, the operating system would automatically resolve the moniker by copying the target directories and files to the selected computer.

As seen from the above, a cut-and-paste operation utilizing the peripheral sharing device with unified clipboard memory enables the user to efficiently transfer data across associated computers. Using the device, with a single set of peripherals, the user can share data across multiple computers without either a network connection or direct connection between them.

Although a single embodiment is specifically illustrated and described herein, it will be appreciated that modifications and variations of the present invention are covered by the above teachings and within the purview of the appended claims without departing from the spirit and intended scope of the invention.

What is claimed is:

1. A method of transferring data from a selected computer to any one of a plurality of computers comprising:
   accepting a first user command to transfer the data from the selected computer to a clipboard in a unified memory on a switching system;
   transferring the data to the clipboard; and
   accepting a second user command to transfer the data from the clipboard on the unified memory to the any one of the plurality of computers.

2. The method of claim 1 further comprising accepting a third command to switch from the selected computer to the any one of the plurality of computers.

3. The method of claim 2 wherein the third command is a request to transfer the data from the clipboard to the any one of the plurality of computers.

4. The method of claim 1 wherein the first user command is a copy command.

5. The method of claim 1 wherein the first user command is a cut command.

6. The method of claim 1 wherein the second user command is a paste command.

7. A system for transferring data, comprising:
   a switching system including a unified memory;
   a first computer coupled to the switching system;
   a second computer coupled to the switching system; and
   a peripheral device coupled to the switching system, the peripheral device capable of accepting commands to transfer the data from the first computer to the unified memory on the switching system, the peripheral device additionally capable of accepting commands to transfer the data from the unified memory on the switching system to the second computer.

8. The system according to claim 7 wherein the peripheral device accepts the commands for execution on one of the first computer and the second computer.

9. The system according to claim 8 wherein the unified memory on the switching system includes a clipboard and the commands to transfer the data include a first command to transfer the data from the first computer to the clipboard in the unified memory on the switching system.

10. The system according to claim 9 wherein the peripheral device is capable of accepting a second command to switch the peripheral device from accepting the commands for execution on the first computer to accepting the commands for execution on the second computer.

11. The system according to claim 10 wherein the commands to transfer the data include a third command to transfer the data from the clipboard in the unified memory on the switching system to the second computer.

12. An article comprising a machine-accessible medium having stored thereon instructions that, when executed by a machine, cause the machine to transfer data from a selected computer to any one of a plurality of computers by:

accepting a first user command to transfer the data from the selected computer to a clipboard in a unified memory on a switching system;

transferring the data to the clipboard; and accepting a second user command to transfer the data from the clipboard on the unified memory to the any one of the plurality of computers.

13. The article according to claim 10 wherein the instructions, when executed by the machine, further case the machine to transfer data by accepting a third command to switch from the selected computer to the any one of the plurality of computers.

14. The article according to claim 10 wherein the third command is a request to transfer the data from the clipboard to the any one of the plurality of computers.

15. The article according to claim 10 wherein the first user command is a copy command.

16. The method article according to claim 10 wherein the first user command is a cut command.

17. The article according to claim 10 wherein the second user command is a paste command.

* * * * *